United States Patent
Newman et al.

(10) Patent No.: US 10,118,503 B2
(45) Date of Patent: Nov. 6, 2018

(54) SUPERCOOLING OF COMPONENTS DURING EXTREME CONDITIONS

(71) Applicant: NIO USA, Inc., San Jose, CA (US)

(72) Inventors: Austin L. Newman, San Jose, CA (US); Alexander J. Smith, White Lake, MI (US); Adam H. Ing, Santa Clara, CA (US); Rick Rajaie, Rochester Hills, MI (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/479,008

(22) Filed: Apr. 4, 2017

(65) Prior Publication Data

US 2018/0281617 A1    Oct. 4, 2018

(51) Int. Cl.
| | |
|---|---|
| *H01M 10/625* | (2014.01) |
| *B60L 11/18* | (2006.01) |
| *B60H 1/00* | (2006.01) |
| *H01M 2/10* | (2006.01) |
| *H01M 10/48* | (2006.01) |
| *H01M 10/633* | (2014.01) |
| *B60H 1/32* | (2006.01) |

(52) U.S. Cl.
CPC ...... *B60L 11/1874* (2013.01); *B60H 1/00278* (2013.01); *B60H 1/00392* (2013.01); *B60L 11/1864* (2013.01); *H01M 2/1077* (2013.01); *H01M 10/486* (2013.01); *H01M 10/625* (2015.04); *H01M 10/633* (2015.04); *B60H 2001/00307* (2013.01); *B60H 2001/3255* (2013.01); *B60L 2240/545* (2013.01); *H01M 2220/20* (2013.01)

(58) Field of Classification Search
CPC .......................... H01M 10/625; H01M 10/633
See application file for complete search history.

(56) References Cited

U.S. PATENT DOCUMENTS

| | | | |
|---|---|---|---|
| 7,635,959 | B2 | 12/2009 | Holden et al. |
| 9,150,080 | B2 | 10/2015 | Kamada et al. |
| 9,490,509 | B2 | 11/2016 | Achhammer et al. |
| 2013/0298583 | A1 | 11/2013 | O'Donnell et al. |
| 2015/0013367 | A1 | 1/2015 | Carpenter |
| 2015/0202986 | A1 | 7/2015 | Hatakeyama et al. |

*Primary Examiner* — Olatunji A Godo
(74) *Attorney, Agent, or Firm* — Sheridan Ross P.C.

(57) ABSTRACT

Embodiments of the present disclosure are directed to providing temporary, additional cooling to one or more elements of the vehicle on an as needed basis, e.g., under extreme conditions, when additional cooling is required or predicted to be needed, etc. According to one embodiment, the RC can be "overclocked" or "supercharged" to provide short-term, high output cooling performance under such conditions. For example, if the cooling system is a 10 kW system, it is increased to 15 kW for a short time period by increasing the electrical current and/or frequency to increase the torque and/or speed of the motor driving the RC. According to one embodiment, the cooling system can also be adapted to more effectively utilize the available cooling capacity, either the standard capacity to temporarily increased capacity, by directing the air or liquid coolant to one or more components in need of extra cooling.

20 Claims, 6 Drawing Sheets

SUPERCOOLING OF COMPONENTS DURING EXTREME CONDITIONS

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
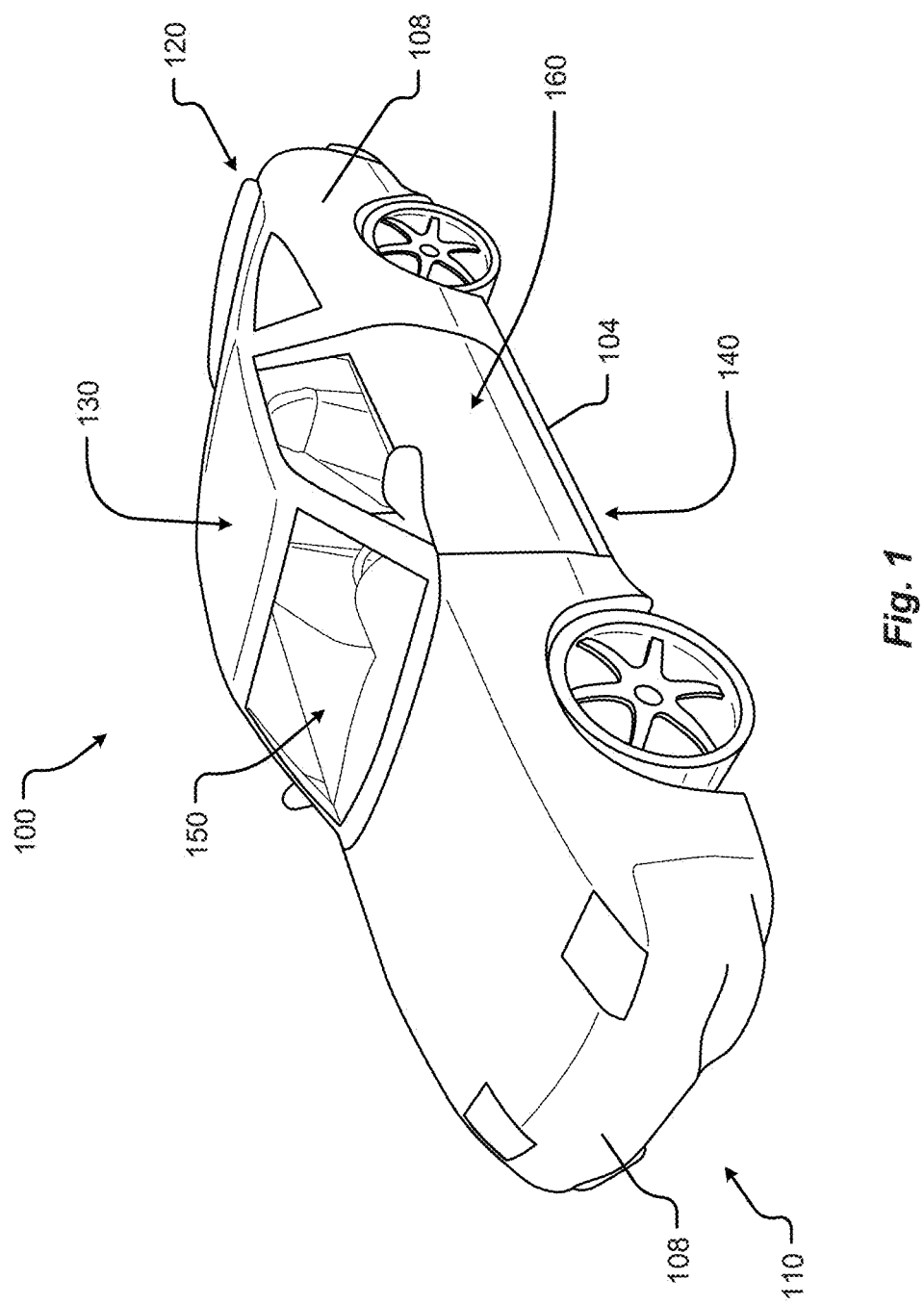
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
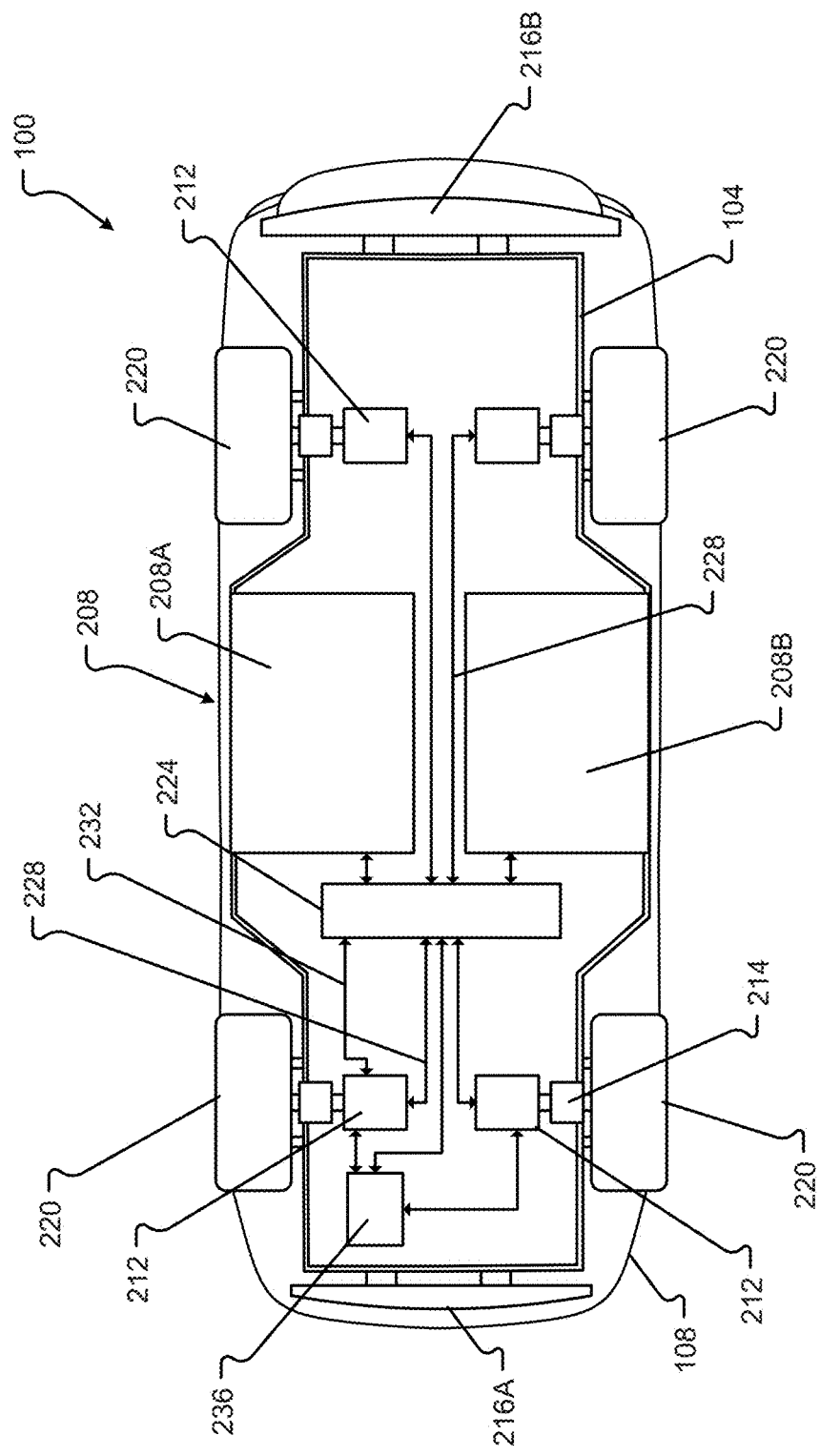
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
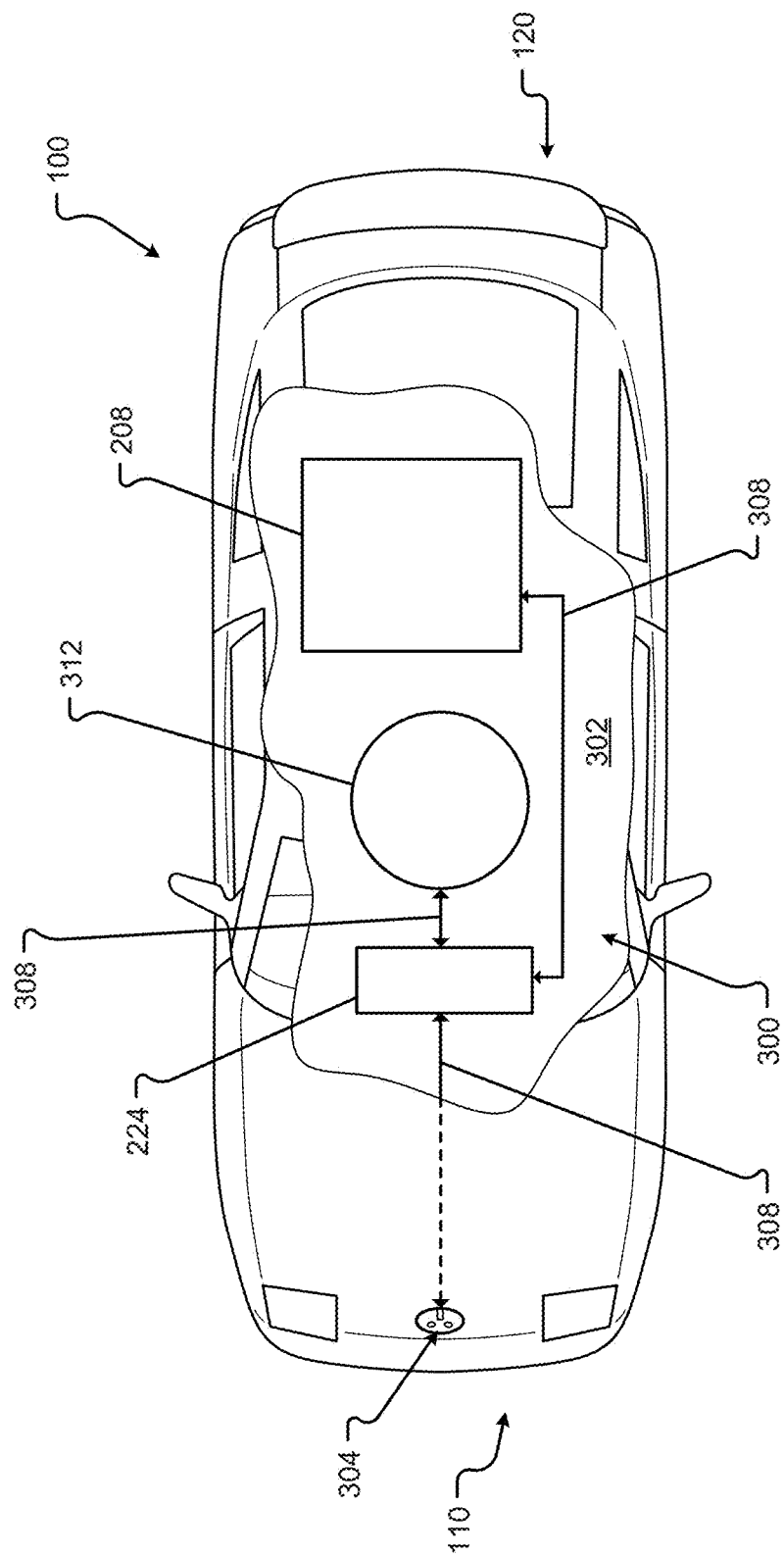
FIG. 3 shows a plan view of the vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

As noted above, the power sources 208A and 208B of the vehicle 100 can comprise a number of batteries, capacitors, or other sources of stored electrical energy. In some cases, these power sources 208A and 208B can be adapted to be removed and/or exchanged as described. Therefore, and according to one embodiment, the power sources 208A and 208B can comprise one or more modules to facilitate removal and/or change of the power sources.

Various elements of a vehicle 100 as described above can generate heat or otherwise require cooling. For example, the power sources 208A and 208B, such as one or more batteries or battery packs, can generate significant amounts of heat during both charging and discharging. Similarly, the charger 312, motors 212, motor controllers 214 and other elements can generate heat during normal operation. Other elements may require cooling in some conditions. For example, the vehicle cabin may be cooled for the sake of passenger comfort. Therefore, the vehicle 100 will typically also include a cooling system. The cooling system can include an air or liquid circulation network to the various elements of the vehicle. The air or liquid circulated through the elements of the vehicle and be cooled by a refrigerant compressor (RC) driven by an electric motor as can be understood by one skilled in the art.

Typically, a vehicle RC is sized to provide adequate cooling to the entire vehicle. However, if there is an extreme condition where one or more onboard devices or elements need increased temperature control beyond what the system has been designed to, there are no pre-existing measure to do so. For example, under rapid charging or hard driving conditions in hot weather, the total heat generated and/or absorbed by the vehicle may exceed the thermal capacity of the cooling system. Accordingly, embodiments of the present disclosure are directed to providing temporary, additional cooling to one or more elements of the vehicle on an as needed basis, e.g., under extreme conditions, when additional cooling is required or predicted to be needed, etc. According to one embodiment, the RC can be "overclocked" or "supercharged" to provide short-term, high output cooling performance under such conditions. For example, if the cooling system is a 10 kW system, it is increased to 15 kW for a short time period by increasing the electrical current and/or frequency to increase the torque and/or speed of the motor driving the RC.

According to one embodiment, the cooling system can also be adapted to more effectively utilize the available cooling capacity, either the standard capacity to temporarily increased capacity, by directing the air or liquid coolant to one or more components in need of extra cooling. For example, the motors and motor controllers may require additional cooling in some situations while the batteries may require additional cooling in others. To more effectively direct the coolant to the individual components, the cooling system can include a set of valves for increasing, decreasing, or even shutting off coolant flow to each component. So, for example, when an element such as the battery pack experiences, or is expected to experience, a high temperature situation, such as during rapid charging or discharging, the coolant flow to another element, such as the cabin cooling, can be decreased or even shut off and the coolant flow to the battery pack can be increased.

According to one embodiment, within the battery packs can exist multiple battery modules with one or more cooling plates on each module. In normal use, not all of these modules heat at a same rate. Rather, one or more modules may heat significantly faster than the others. To effectively cool the modules experiencing a higher load or temperature level, the cooling system can increase the RC output as noted above and, at the same time, operate, i.e., open and/or close, valves within the battery pack to direct coolant flow through cooling plates of the modules experiencing the high load and/or temperature and possibly away from modules not directly related to the high temperature condition. This can be especially helpful in an emergency situation in which a potentially disastrous condition can be avoided by focusing most or all of the cooling capacity of the cooling system to a battery module which is undergoing thermal runaway.

For example, one cell of a battery may have a manufacturing defect which manifests during normal driving. This defect can cause that single battery cell to start thermal runaway. Embodiments of the present disclosure can detect the module getting abnormally hot and focus cooling on that module to prevent the heat from propagating cell-to-cell and/or causing a catastrophic event such as a fire or explosion. Without the focused cooling, one cell may heat up nearby cells enough to cause them to also enter thermal runaway.

Figure 4:
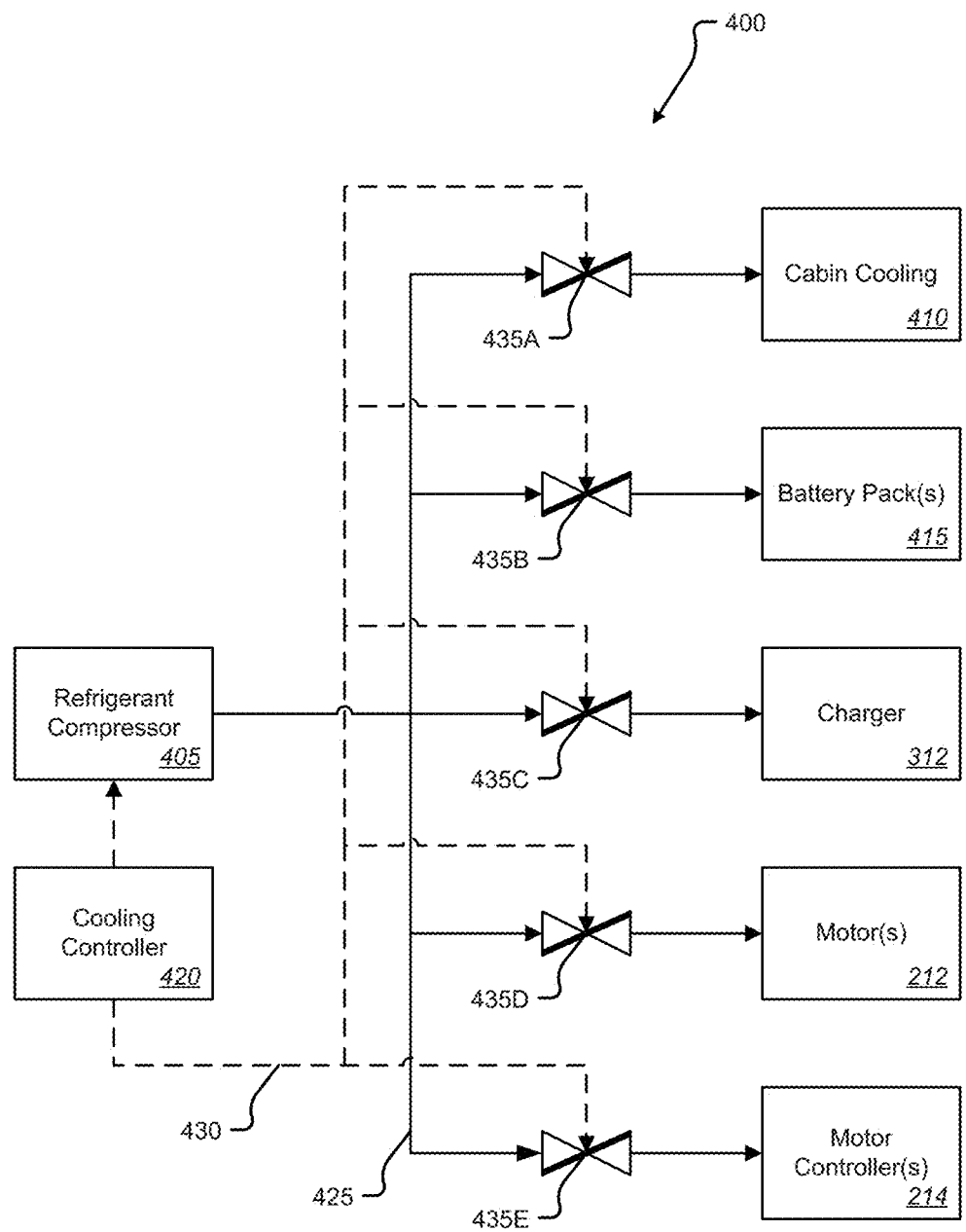
FIG. 4 is a block diagram illustrating components of a vehicle cooling system according to one embodiment of the present disclosure.

FIG. 4 is a block diagram illustrating components of a vehicle cooling system according to one embodiment of the present disclosure. As illustrated in this example, the cooling system 400 can comprise a refrigerant compressor (RC) 405 and a plurality of elements that generate heat and/or require cooling. For example, these elements can include, but are not limited to, a cabin cooling system 410, power sources, such as one or more batteries or battery packs 415, battery charger 312, motors 212, motor controllers 214, and other elements. The cooling system 400 can include an air or liquid circulation network of coolant flow tubing 425 to the various elements of the vehicle and a cooling controller 420 for monitoring one or more temperature sensors (not shown here) on each element and controlling the RC.

As noted above, the RC 405 can be sized to provide adequate cooling to the elements of the vehicle under a normal range of expected operating conditions. However, if one or more the elements need increased temperature control beyond what the system has been designed to, for example, under rapid charging or hard driving conditions in hot weather, the cooling controller 420 can "overclock" or "supercharge" the RC 405 to provide short-term, high output cooling under such conditions. For example, the cooling controller 420 can increase the electrical current and/or frequency to increase the torque and/or speed of the motor driving the RC thereby providing a boost to the cooling capacity of the entire system 400.

According to one embodiment, the cooling system 400 can also include a set of electrically operated system-level valves 435A-435E on the coolant flow tubing 425 and connected with the cooling controller 420 through a set of control signal conductors 430. The cooling controller can operate these valves 435A-435E to more effectively utilize the available cooling capacity, either the standard capacity to temporarily increased capacity, by opening and closing the valves 435A-435E to direct the air or liquid coolant to one or more components in need of extra cooling. For example, the battery packs may require additional cooling under rapid charging or discharging conditions. In such cases, the cooling controller 420 can temporarily increase the output of the RC 405 and operate the valves, e.g., opening valve 435B and closing valve 435A, for example, to more effectively direct the coolant to the battery packs 415.

Figure 5:
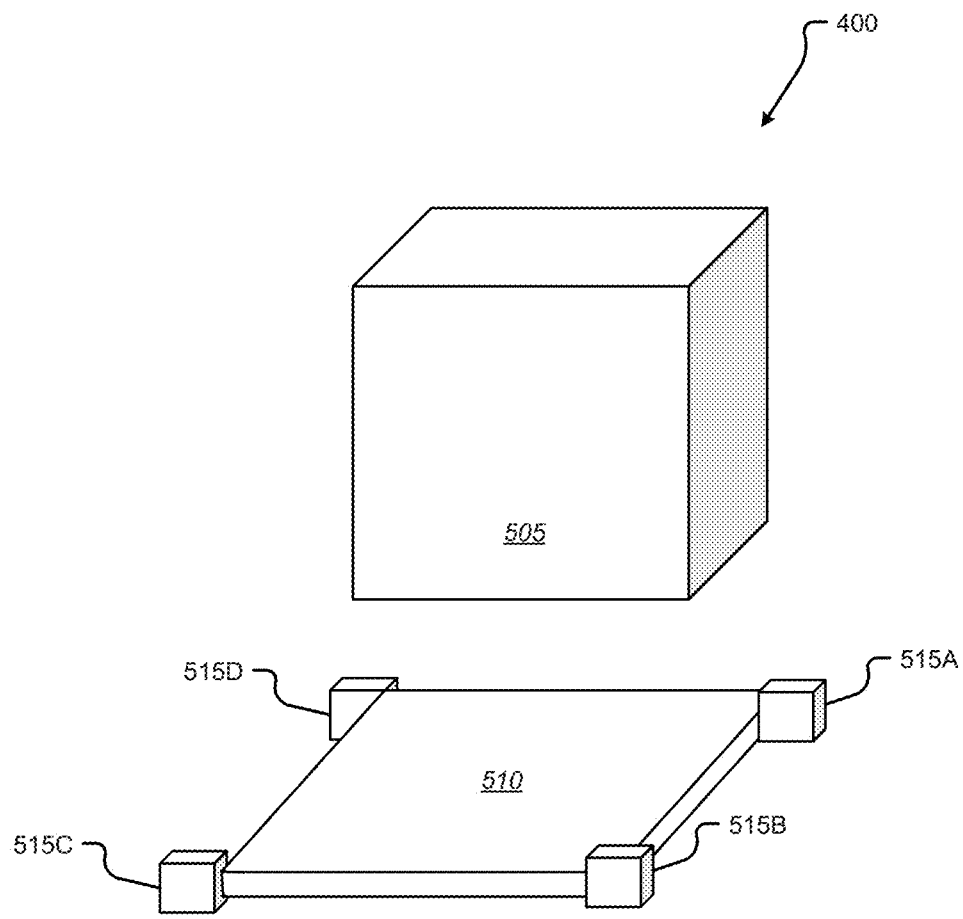
FIG. 5 is a block diagram illustrating an exploded, isometric view of components of a battery module according to one embodiment of the present disclosure.

According to one embodiment, within the battery packs 415 can exist multiple battery modules. FIG. 5 is a block diagram illustrating an exploded, isometric view of components of a battery module according to one embodiment of the present disclosure. As illustrated in this example, the battery module 500 can comprise a battery cell 505 and a cooling plate 510. The cooling plate 510 can comprise a heat exchanger through which coolant is circulated. When mounted onto the battery cell 505 heat can be drawn away from the battery cell 505 by coolant circulated through the cooling plate 510. According to one embodiment, the cooling plate 510 can be coupled with the coolant flow tubing 425 of the cooling system 400 through a plurality of module level valves 515A-515D. The module level valves 515A-515D can comprise electrically operated valves controlled by the cooling controller 420 in a manner similar to the system level valves 435A-435E described above. That is, the cooling controller 420 can temporarily increase the output of the RC 405, operate the system level valves 435A-435E, for example, to more effectively direct the coolant to the battery packs 415, and operate the module level valves 515A-515D to direct the coolant to individual battery modules 500 within the battery pack 415 experiencing high heat conditions.

Figure 6:
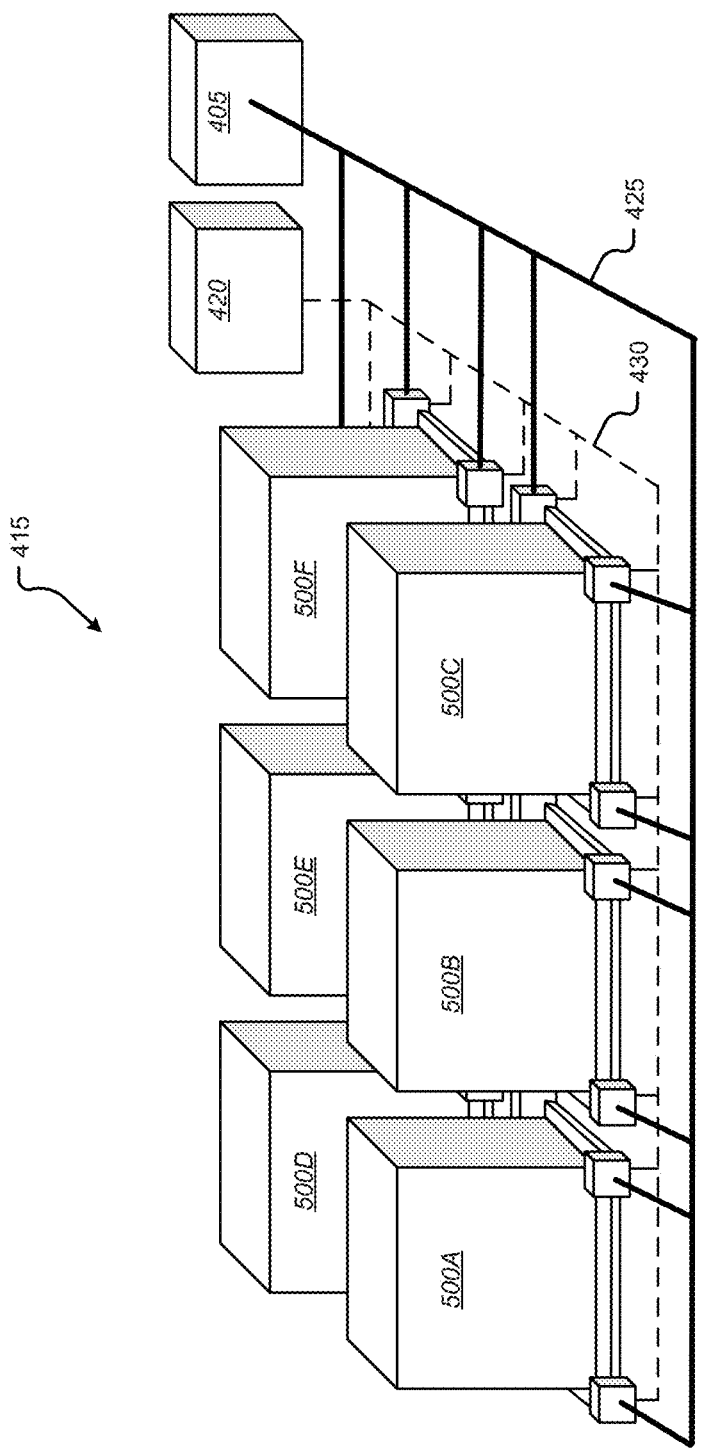
FIG. 6 is a diagram illustrating an isometric view of an assembled battery pack and related components according to one embodiment of the present disclosure.

FIG. 6 is a diagram illustrating an isometric view of an assembled battery pack and related components according to one embodiment of the present disclosure. As illustrated in this example, the battery pack 415 comprises a plurality of battery modules 500A-500F as described above with reference to FIG. 5. While not shown here for the sake of simplicity and clarity, the individual batter modules 500A-500F may be mounted on or otherwise joined by one or more supporting members of different types to join the individual battery modules 500A-500F into a single structural unit. The module level valves 515A-515D of each battery module 500A-500F can also be connected with the RC 405 through the coolant flow tubing 425 and with the cooling controller 420 through the control signal conductors 430 as described above with reference to FIG. 4. In normal use, and as noted above, these modules 500A-500F may not all heat at a same rate. Rather, one or more modules 500A or 500E, for example, may heat significantly faster than the others. To effectively cool the modules 500A or 500E experiencing a higher load or temperature level, the cooling controller 420 can increase the RC 405 output as noted above, operate one or more of the system level valves 435A-435E to increase coolant flow to the battery pack 415 also as noted above and, at the same time, operate, i.e., open and/or close, module level valves 515A-515D on individual battery modules 500A-500F within the battery pack 415 to direct coolant flow through cooling plates 510 of the modules 500A or 500E experiencing the high load and/or temperature and possibly away from modules, e.g., 500B, 500C, 500D, and/or 500F, not directly related to the high temperature condition.

Stated another way, a cooling system 400 for a vehicle 100 can comprise a refrigerant compressor 405 and a network of coolant flow tubing 425 coupled with the refrigerant compressor 405 and each of the plurality of components 212, 214, 312, 410, and 415. The refrigerant compressor 405 can circulate coolant through the coolant flow tubing 425 to each of the plurality of components 212, 214, 312, 410, and 415. A cooling system controller 420 can be electrically connected with the refrigerant compressor 405. The cooling system controller 420 can operate the refrigerant cooler 405 at a first output level during operation of the vehicle 100 and, upon detection of a predetermined condition, can operate the refrigerant cooler 405 at a second output level, wherein the second output level of the refrigerant compressor 405 provides a greater cooling capacity to the cooling system 400 than the first output level of the refrigerant compressor 405.

A plurality of system level valves 435A-435E can be disposed within the network of coolant flow tubing 425. Each system level valve 435A-435E can be electrically connected with and operable by the cooling controller 420 to control coolant flow to each of the plurality of components 212, 214, 312, 410, and 415. Upon detection of the predetermined condition, the cooling controller 420 can further operate one or more of the system level valves 435A-435E to direct coolant based on the detected predetermined condition. Directing coolant based on the detected predetermined condition can comprise restricting coolant flow to a first component of the plurality of components, e.g., 410, and increasing coolant flow to a second component of the plurality of components, e.g., 415. The predetermined condition can comprise, for example, a temperature of one or more of the components of the plurality of components 212, 214, 312, 410, and 415 exceeding a predetermined limit or a condition predicted to create heat in one or more of the components of the plurality of components 212, 214, 312, 410, and 415.

The vehicle 100 can comprise an electric vehicle and the plurality of components can comprise two or more of a cabin cooling system 410, one or more battery packs 415, a battery charger 312, one or more motors 212, or one or more motor controllers 214. Each battery pack 415 of the one or more battery packs 415 can comprise a plurality of battery modules 500A-500F. Each of the battery modules 500 can comprise a battery cell 505, a cooling plate 510 disposed adjacent to the battery cell 505, and one or more component level valves 515A-515D connecting the cooling plate 510 with the network of coolant tubing 425. Coolant from the network of coolant tubing 425 can flow through the component level valves 515A-515D to the cooling plate 510 and cools the battery cell 505. The component level valves 515A-515D of each battery module 500 can be electrically connected with and operable by the cooling controller 420 to control coolant flow to the cooling plate 510 of each of the battery modules 500. Upon detection of the predetermined condition, the cooling controller 420 can further operate one or more of the component level valves 515A-515D to direct coolant based on the detected predetermined condition. Directing coolant based on the detected predetermined condition can comprise restricting coolant flow to the cooling plate 510 of a first battery module, e.g., 500A of the plurality of battery modules 500A-500F and increasing coolant flow to the cooling plate 510 a second battery module, e.g., 500C of the plurality of battery modules 500A-500F.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle comprising: a plurality of components; and a cooling system adapted to cool each of the plurality of components, the cooling system comprising: a refrigerant compressor; a network of coolant flow tubing coupled with the refrigerant compressor and each of the plurality of components, wherein the refrigerant compressor circulates coolant through the coolant flow tubing to each of the plurality of components; and a cooling system controller electrically connected with the refrigerant compressor, wherein the cooling system controller operates the refrigerant cooler at a first output level during operation of the vehicle and, upon detection of a predetermined condition, operates the refrigerant cooler at a second output level, wherein the second output level of the refrigerant compressor provides a greater cooling capacity to the cooling system than the first output level of the refrigerant compressor.

Aspects of the above vehicle further include a plurality of system level valves within the network of coolant flow tubing, each system level valve electrically connected with and operable by the cooling controller to control coolant flow to each of the plurality of components.

Aspects of the above vehicle include wherein, upon detection of the predetermined condition, the cooling controller further operates one or more of the system level valves to direct coolant based on the detected predetermined condition.

Aspects of the above vehicle include wherein directing coolant based on the detected predetermined condition comprises restricting coolant flow to a first component of the plurality of components and increasing coolant flow to a second component of the plurality of components.

Aspects of the above vehicle include wherein the predetermined condition comprises a temperature of one or more of the components of the plurality of components exceeding a predetermined limit.

Aspects of the above vehicle include wherein the predetermined condition comprises a condition predicted to create heat in one or more of the components of the plurality of components.

Aspects of the above vehicle include wherein the vehicle comprises an electric vehicle.

Aspects of the above vehicle include wherein the plurality of components comprises two or more of a cabin cooling system, one or more battery packs, a battery charger, one or more motors, or one or more motor controllers.

Aspects of the above vehicle include wherein each battery pack of the one or more battery packs comprises a plurality of battery modules, each of the battery modules comprising: a battery cell; a cooling plate disposed adjacent to the battery cell; and one or more component level valves connecting the cooling plate with the network of coolant tubing, wherein coolant from the network of coolant tubing flows through the component level valves to the cooling plate and cools the battery cell.

Aspects of the above vehicle include wherein the component level valves of each battery module are electrically connected with and operable by the cooling controller to control coolant flow to the cooling plate of each of the battery modules.

Aspects of the above vehicle include wherein, upon detection of the predetermined condition, the cooling controller further operates one or more of the component level valves to direct coolant based on the detected predetermined condition.

Aspects of the above vehicle include wherein directing coolant based on the detected predetermined condition comprises restricting coolant flow to the cooling plate of a first battery module of the plurality of battery modules and increasing coolant flow to a second battery module of the plurality of battery modules.

Embodiments include a cooling system for an electric vehicle, the cooling system comprising: a cooling system adapted to cool each of the plurality of components, the cooling system comprising: a refrigerant compressor; a network of coolant flow tubing coupled with the refrigerant compressor and each of the plurality of components, wherein the refrigerant compressor circulates coolant through the coolant flow tubing to each of the plurality of components; and a cooling system controller electrically connected with the refrigerant compressor, wherein the cooling system controller operates the refrigerant cooler at a first output level during operation of the vehicle and, upon detection of a predetermined condition, operates the refrigerant cooler at a second output level, wherein the second output level of the refrigerant compressor provides a greater cooling capacity to the cooling system than the first output level of the refrigerant compressor.

Aspects of the above cooling system further include a plurality of system level valves within the network of coolant flow tubing, each system level valve electrically connected with and operable by the cooling controller to control coolant flow to each of the plurality of components.

Aspects of the above cooling system include wherein, upon detection of the predetermined condition, the cooling controller further operates one or more of the system level valves to direct coolant based on the detected predetermined condition, wherein the predetermined condition comprises a temperature of one or more of the components of the plurality of components exceeding a predetermined limit or a condition predicted to create heat in one or more of the components of the plurality of components.

Aspects of the above cooling system include wherein directing coolant based on the detected predetermined condition comprises restricting coolant flow to a first component of the plurality of components and increasing coolant flow to a second component of the plurality of components.

Embodiments include a battery pack for an electric vehicle comprising a plurality of battery modules, each of the battery modules comprising: a battery cell; a cooling plate disposed adjacent to the battery cell; and one or more component level valves connecting the cooling plate with a network of coolant tubing of a cooling system of a vehicle, wherein coolant from the network of coolant tubing flows through the component level valves to the cooling plate and cools the battery cell and wherein the component level valves of each battery module are operable by a cooling controller to control coolant flow to the cooling plate of each of the battery modules.

Aspects of the above battery pack include wherein, upon detection of the predetermined condition, the one or more of the component level valves are operable by the cooling controller to direct coolant based on the detected predetermined condition.

Aspects of the above battery pack include wherein directing coolant based on the detected predetermined condition comprises restricting coolant flow to the cooling plate of a first battery module of the plurality of battery modules and increasing coolant flow to a second battery module of the plurality of battery modules.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle comprising:
   a plurality of components; and
   a cooling system adapted to cool each of the plurality of components, the cooling system comprising:
      a refrigerant compressor;
      a network of coolant flow tubing coupled with the refrigerant compressor and each of the plurality of components, wherein the refrigerant compressor circulates coolant through the coolant flow tubing to each of the plurality of components; and
      a cooling system controller electrically connected with the refrigerant compressor, wherein the cooling system controller operates the refrigerant cooler at a first output level during operation of the vehicle and, upon detection of a predetermined condition, operates the refrigerant cooler at a second output level, wherein the second output level of the refrigerant compressor provides a greater cooling capacity to the cooling system than the first output level of the refrigerant compressor.

2. The vehicle of claim 1, further comprising a plurality of system level valves within the network of coolant flow tubing, each system level valve electrically connected with and operable by the cooling controller to control coolant flow to each of the plurality of components.

3. The vehicle of claim 2, wherein, upon detection of the predetermined condition, the cooling controller further operates one or more of the system level valves to direct coolant based on the detected predetermined condition.

4. The vehicle of claim 3, wherein directing coolant based on the detected predetermined condition comprises restricting coolant flow to a first component of the plurality of components and increasing coolant flow to a second component of the plurality of components.

5. The vehicle of claim 2, wherein the predetermined condition comprises a temperature of one or more of the components of the plurality of components exceeding a predetermined limit.

6. The vehicle of claim 2, wherein the predetermined condition comprises a condition predicted to create heat in one or more of the components of the plurality of components.

7. The vehicle of claim 3, wherein the vehicle comprises an electric vehicle.

8. The vehicle of claim 7, wherein the plurality of components comprises two or more of a cabin cooling system, one or more battery packs, a battery charger, one or more motors, or one or more motor controllers.

9. The vehicle of claim 8, wherein each battery pack of the one or more battery packs comprises a plurality of battery modules, each of the battery modules comprising:
   a battery cell;
   a cooling plate disposed adjacent to the battery cell; and
   one or more component level valves connecting the cooling plate with the network of coolant tubing, wherein coolant from the network of coolant tubing flows through the component level valves to the cooling plate and cools the battery cell.

10. The vehicle of claim 9, wherein the component level valves of each battery module are electrically connected with and operable by the cooling controller to control coolant flow to the cooling plate of each of the battery modules.

11. The vehicle of claim 10, wherein, upon detection of the predetermined condition, the cooling controller further operates one or more of the component level valves to direct coolant based on the detected predetermined condition.

12. The vehicle of claim 11, wherein directing coolant based on the detected predetermined condition comprises restricting coolant flow to the cooling plate of a first battery module of the plurality of battery modules and increasing coolant flow to a second battery module of the plurality of battery modules.

13. A cooling system for an electric vehicle, the cooling system comprising:
   a cooling system adapted to cool each of the plurality of components, the cooling system comprising:
      a refrigerant compressor;
      a network of coolant flow tubing coupled with the refrigerant compressor and each of the plurality of components, wherein the refrigerant compressor circulates coolant through the coolant flow tubing to each of the plurality of components; and
      a cooling system controller electrically connected with the refrigerant compressor, wherein the cooling system controller operates the refrigerant cooler at a first output level during operation of the vehicle and, upon detection of a predetermined condition, operates the refrigerant cooler at a second output level, wherein the second output level of the refrigerant compressor provides a greater cooling capacity to the cooling system than the first output level of the refrigerant compressor.

14. The cooling system of claim 13, further comprising a plurality of system level valves within the network of coolant flow tubing, each system level valve electrically connected with and operable by the cooling controller to control coolant flow to each of the plurality of components.

15. The cooling system of claim 14, wherein, upon detection of the predetermined condition, the cooling controller further operates one or more of the system level valves to direct coolant based on the detected predetermined condition.

16. The cooling system of claim 15, wherein the predetermined condition comprises a temperature of one or more of the components of the plurality of components exceeding a predetermined limit or a condition predicted to create heat in one or more of the components of the plurality of components.

17. The cooling system of claim 16, wherein directing coolant based on the detected predetermined condition comprises restricting coolant flow to a first component of the plurality of components and increasing coolant flow to a second component of the plurality of components.

18. A battery pack for an electric vehicle comprising a plurality of battery modules, each of the battery modules comprising:
   a battery cell;
   a cooling plate disposed adjacent to the battery cell; and
   one or more component level valves connecting the cooling plate with a network of coolant tubing of a cooling system of a vehicle, wherein coolant from the network of coolant tubing flows through the component level valves to the cooling plate and cools the battery cell and wherein the component level valves of each battery module are operable by a cooling controller to control coolant flow to the cooling plate of each of the battery modules.

19. The battery pack of claim 18, wherein, upon detection of the predetermined condition, the one or more of the component level valves are operable by the cooling controller to direct coolant based on the detected predetermined condition.

20. The battery pack of claim 19, wherein directing coolant based on the detected predetermined condition comprises restricting coolant flow to the cooling plate of a first battery module of the plurality of battery modules and increasing coolant flow to a second battery module of the plurality of battery modules.

* * * * *